Patented July 14, 1953

2,645,631

UNITED STATES PATENT OFFICE 2,645,631

EMULSION COPOLYMERIZATION OF SULFUR DIOXIDE AND UNSATURATED ORGANIC COMPOUNDS

Willie W. Crouch, Bartlesville, Okla., and Ernest W. Cotten, deceased, late of Bartlesville, Okla., by Richard K. Harris, administrator, Bartlesville, Okla., assignors to Phillips Petroleum Company, a corporation of Delaware No Drawing. Application February 16, 1948, Serial No. 8,755

28 Claims. (Cl. 260—79.3)

This invention relates to the production of synthetic resinous materials formed by reaction between sulfur dioxide and one or more unsaturated organic compounds.

It has been well known for a number of years that sulfur dioxide will react with numerous unsaturated organic materials to form heteropolymeric resinous products. Apparently the resin is produced from equimolar quantities of sulfur dioxide and the unsaturated organic material. The reaction appears to take place only in the liquid phase and it will proceed in the absence of catalysts only in the presence of actinic light, or it will proceed in the presence of any one of a large number of catalytic materials, most of which appear to have oxidizing properties, in the dark or in the light. Some of the more important catalysts for promoting this reaction are oxygen, hydrogen peroxide, ozone, various nitrates such as silver and lithium nitrates, nitrites, persulfates, chlorates, perchlorates, ascaridole, ozonized olefins, etc. The phrase "catalytic agent" herein includes agents such as actinic light and the catalysts just mentioned. Organic compounds which enter into the formation of such resins include mono-olefins, cyclo-olefins, substituted aliphatic olefins such as styrene, diolefins such as butadiene, isoprene, cyclohexadiene, and the like, acetylenes and polyfunctional unsaturated compounds such as allyl alcohol, vinyl acetate, allyl ethyl ether, o-allylamisole, o-allylphenol, p-bromoallylbenzene, methyl undecylenate, undecylemyl alcohol, undecylenic acid, etc. When mixtures of such unsaturated organic compounds are used, the resulting resin appears to have been formed by a copolymerization of the unsaturated compounds with sulfur dioxide since its properties do not correspond to blends of resins produced from the individual unsaturated organic compounds and often have properties which are superior to any one of the resins produced from the individual unsaturated compounds. For many of the unsaturated compounds there appears to be a "ceiling temperature" above which the reaction does not take place, and in such instances it is necessary to conduct the resin-forming reaction at a temperature below the ceiling temperature and, when forming the resin from a mixture of organic unsaturated compounds, it appears desirable to conduct the reaction at a temperature below the ceiling temperature of the material having the lowest ceiling temperature. The resin-forming reaction is somewhat exothermic and generally some provision must be made for removing the heat of reaction. All of these features are more fully described in the literature.

The resins heretofore produced have generally been formed in the presence of only a moderate excess of sulfur dioxide and have been recovered as solid materials possessing a horn-like appearance or having a porous expanded form. These materials are tough and difficult to handle. In order to secure successful commercial products it has been necessary to grind these mechanically in order to form a finely divided material, thus facilitating removal of occluded impurities. Even when ground to a fine powder, it has often been difficult to remove completely all of the occluded impurities, such as uncombined reactants and other materials either present in the reactants as charged to the process or introduced in processing and handling the resin. In some instances it appears that the grinding procedure results in the introduction of minute quantities of metallic impurities which affect the clarity and general appearance of the molded products. Further, the grinding procedure develops undesirable heat which tends to soften the resin and cause the ground particles of resin to fuse, thus increasing the difficulty of the removal of impurities and in some instances resulting in an unsatisfactory molding powder because of particle size. Also, even if the grinding operation results in a satisfactory, fine powder, the removal of occluded impurities is difficult and expensive.

A method has now been found whereby unsaturated organic compounds and sulfur dioxide are caused to react to produce resinous products of varied properties and wide adaptability, said products being readily freed from unreacted reactants and other impurities. The process comprises reacting the unsaturated compound and sulfur dioxide in aqueous emulsion in the presence of suitable catalysts and emulsifying agents. When the reaction is carried out in aqueous emulsion the material remains in a fluid condition and can be agitated readily, thus maintaining adequate contact of the reactants at all stages of the conversion. The resinous product, which is obtained in the form of an emulsion, can be stripped with steam to remove unreacted sulfur dioxide, unreacted olefin, and other volatile impurities. It can also be readily washed and the removal of additional impurities is accomplished in this manner. The resin is obtained in a finely divided form and thus the grinding or pulverizing operation that must ordinarily be performed is eliminated.

An object of this invention is to react sulfur dioxide and an unsaturated organic compound to form a heteropolymeric resin.

A further object of this invention is to produce a heteropolymeric resin of sulfur dioxide and an unsaturated organic compound in a finely divided, dry and pure form.

A still further object of this invention is to effect a continuous production, from sulfur dioxide and a low-boiling olefinic material, of a resin in a finely divided form.

Further objects and advantages of this invention will become apparent, to one skilled in the art, from the accompanying disclosure and discussion.

The production of materials of the polymeric type in aqueous emulsion is well known. Emulsion polymerization methods are particularly important and are widely used in the manufacture of synthetic rubber, and the like. Usually, however, the monomers employed in these processes are compounds such as butadiene, isoprene, chloroprene, methyl acrylate, methyl methacrylate, acrylonitrile, styrene, and the like. These monomers are chemically neutral, that is, they have neither strongly acidic nor basic properties. Furthermore, most of them have little or no solubility in water so that when they are used in emulsion polymerization processes they form a water-insoluble phase which contains substantially all of the monomers. These compounds are also non-electrolytes, that is, any part of the material that enters the water phase is not ionized and therefore does not interfere with the action of the emulsifying agent.

In contrast to the above mentioned monomers, sulfur dioxide is highly soluble in water and reacts with water to form the electrolyte, sulfurous acid, which has pronounced acidic properties. In the emulsion copolymerization of sulfur dioxide with unsaturated compounds, the sulfur dioxide is divided between the aqueous and nonaqueous phases but a substantial portion of it remains in the aqueous phase which, as hereinbefore mentioned, is quite acidic. The usual emulsifying agents employed for carrying out polymerization reactions are not applicable in the presence of sulfur dioxide. In fact, the addition of an acidic electrolyte such as sulfurous acid to a resin or rubber latex prepared in the usual way is known to be an effective means of coagulating the latex and agglomerating the polymer. Thus it is entirely unobvious and unpredictable to one skilled in the art that emulsion polymerization methods can be applied to the production of copolymers in which sulfur dioxide is employed as a monomer.

It has now been found that satisfactory emulsion polymerization systems may be provided for the interaction of unsaturated organic compounds and sulfur dioxide through the use of selected emulsifying agents which are effective at low pH. Thus, while emulsifiers such as soaps are inapplicable since they react with sulfurous acid, other emulsifiers which are salts of acids may be used, for example, salts of sulfonic acids. These latter compounds are more strongly acidic than sulfurous acid. Surface active salts of organic amines are also applicable.

In one general embodiment, the process of the present invention comprises the preparation of an aqueous emulsion of a monoolefin with sulfur dioxide in the presence of a suitable emulsifying agent and a catalyst, such as lithium nitrate. The emulsified reactants are agitated at a reaction temperature for a period necessary to effect the desired conversion, after which the latex may be subjected to a stripping operation to remove unreacted olefin and sulfur dioxide together with any other volatile impurities. Separation of the resin is effected by coagulation of the latex, such as with brine-alcohol, brine-acid, solutions of electrolytes, etc., followed by water washing, filtration, and drying of the product. The resinous material thus obtained is a light, soft, fine white powder, its solubility in various solvents depending upon the olefinic material employed. For example, when 1-butene is used, the product is completely soluble in acetone.

The process of this invention not only possesses numerous advantages for the preparation of resins but it also yields stable latices as intermediate products. These latices are produced in the form of emulsions and are extremely valuable for use in various impregnating and coating operations such as treatment of paper, cloth, and the like, and they may be mixed with other latices, such as a synthetic rubber latex, to produce a variety of materials. Since the latices are stable they can be stored as such for indefinite periods. The resins, obtained by coagulation of the latices, have many advantages over similar resins prepared by methods heretofore employed. The resins are easily recovered from the latices and are readily freed from unreacted sulfur dioxide, olefins, and other materials normally present as impurities. They may be made to precipitate in the form of a fine-grained powder which can be filtered, dried, and washed free of emulsifier. They are useful as molding powders and are applicable in any of the numerous areas where resinous powders are employed.

Unsaturated organic compounds which are applicable in this invention are those which will react with sulfur dioxide to produce heteropolymeric compounds, under the other conditions heretofore employed by the prior art. Most of such reactants contain an olefinic linkage, and may be represented by the formula

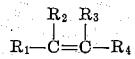

wherein $R_1$ and $R_2$ may be hydrogen or alkyl, or $R_1$ may be a constituent of a carbocyclic ring in which $R_4$ is a member, and $R_3$ and $R_4$ may be hydrogen, alkyl, alkenyl, aryl, aralkyl, or have an acetylenic linkage, or substituted groups thereof wherein substituents such as halo, nitro, hydroxyl, carbocyclic, cyano, and the like may be present, or $R_4$ may be a constituent of a carbocyclic ring in which $R_1$ is also a member and wherein one of the R's can be halogen. In general the olefinic compound employed will not contain more than twenty carbon atoms per molecule. Examples of olefinic compounds which may be used include 1-butene, 2-butene, propylene, isobutylene, pentenes, hexenes, cyclohexene, butadienes, styrene, alpha-methyl styrene, alphachloro styrene, vinyl acetylenes, vinyl chloride, vinyl bromide, and the like. It is also frequently desired to employ a mixture of olefinic compounds, rather than a single olefinic compound, in carrying out the process of this invention.

When operating according to the manner herein described it is generally found that substantially equimolar proportions of olefinic compound and sulfur dioxide react together. However, it is sometimes desired to use a molar excess of sulfur dioxide, say a 2:1 mol ratio of sulfur dioxide to olefinic material. In some cases it may even be desirable to use a higher ratio of the one reactant to the other, for example, a ratio of 5:1, or greater, depending upon operating conditions, olefinic material employed, amount of aqueous medium, etc., although it appears that, even in such cases, equimolar quantities of sulfur dioxide and olefinic compound enter into reaction. Frequently it will be desirable to remove the reactants from the reaction zone, and separate unreacted materials, when between about 70 and about 97 per cent of the reactant present in the lesser amount has reacted. When some diolefins are used as reactants, under some conditions, these materials tend to undergo homopolymerization to form rubber-like products; such reactions are undesired in our invention and conditions should be chosen with such diolefinic reactants, to inhibit such homopolymerization and favor joint interreaction to produce heteropolymeric resins.

Emulsifying agents which are applicable are those which are active in an aqueous medium which has a pH below 7. The aqueous medium in the emulsion used generally has a pH of about 1 to 2, and sometimes has a pH as low as about 0.5. The emulsifying agent used should, of course, be effective at the pH of the aqueous medium in the reaction mixture. Among the compounds which have been found effective are the long chain alkyl sodium sulfates and the branched chain aliphatic or aromatic sodium sulfonates, salts of organic bases such as amine salts, and quaternary ammonium salts. Examples of these materials are lauryl sodium sulfate, diamyl sodium sulfosuccinate, di-secondary-butyl naphthalene sodium sulfonate, dodecylamine hydrochloride, dodecylamine sulfate, and the like. The amount of emulsifying agent employed is that quantity which is necessary to produce a stable emulsion of the ingredients. In some cases an amount as low as about 1 part per 100 parts reactants (olefin plus sulfur dioxide) is considered sufficient and usually an amount not to exceed about 10 parts is added.

Catalysts applicable in this process are the same as those which have been found effective when carrying out the reaction between olefinic compounds and sulfur dioxide by methods heretofore employed. Examples of these catalytic materials include nitrates of the alkali metals and ammonium, nitric acid, potassium persulfate, hydrogen peroxide, organic peroxides, such as cumene hydroperoxide, peracetic acid, and the like. The amount of catalyst used may vary over a wide range and will depend upon the material chosen. In cases where alkali metal nitrates or ammonium nitrate are employed, the amount may vary from 0.03 to 0.60 part per 100 parts reactants with an amount ranging from 0.15 to 0.45 part being generally preferred. With other materials the quantity of catalyst used may be somewhat higher but in any event it is determined by the case at hand.

Temperatures for carrying out the resin-producing reactions of this invention will usually fall within the range of about $-10$ to about 60° C., with the narrower range 10 to 50° C. being most frequently preferred. However, in some instances it may be considered advisable to employ temperatures below $-10°$ C. in order to get a more satisfactory reaction.

Obviously when polymerization are carried out in aqueous emulsion in the absence of freezing point depressants, temperatures below the freezing point of the acidic aqueous medium cannot be employed. The use of various additive agents, however, makes a process of the type disclosed herein applicable at lower temperatures. An example of such a low temperature system is a glycerin-water solution, and the term "aqueous emulsion" should be construed to include the use of an aqueous medium comprising water and a sufficient amount of a water-soluble component to lower the freezing point below the desired polymerization temperature, whether or not the actual polymerization temperature is above or below 0° C. It is generally preferred that the emulsion be of an "oil in water" type, with the ratio of aqueous medium to organic monomeric material between about 1.5:1 and about 10:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

Advantages of this invention are illustrated by the following examples. The reactants, and their proportions, and the other specific ingredients of the recipes are presented as being typical and should not be construed to limit the invention unduly.

EXAMPLE I

An olefin-sulfur dioxide resin was prepared in aqueous emulsion using the following recipe:

| | Parts by weight |
|---|---|
| 1-butene | 46.5 |
| Sulfur dioxide | 61.8 |
| Lithium nitrate | 0.3 |
| Di-sec.-butyl naphthalene sodium sulfonate | 5.0 |
| Water | 180 |

The reactants were emulsified in water and the mixture agitated throughout the reaction period while the temperature was held at 30° C. At the end of 21 hours a conversion of 87 per cent had been reached. No precoagulation of the resinous product occurred during the reaction period. For the removal of unreacted sulfur dioxide, olefin, and other volatile impurities the latex was stripped by heating to 65° C. under partial vacuum.

Separation of the solid resin was effected by coagulation of the latex with methanol and brine, followed by washing with water, filtering, and drying under vacuum several hours at 55° C. The product was a light, soft, very fine white powder, completely soluble in acetone.

Two reactions similar to that described above were carried out except that in one case lauryl sodium sulfate was used as the emulsifier while in the other diamyl sodium sulfosuccinate was employed. The yields of solid resin obtained after a 21-hour reaction period were 68 and 67 per cent, respectively. The products were similar to that obtained when di-sec.-butyl naphthalene sodium sulfonate was used as the emulsifying agent.

EXAMPLE II

A series of four olefin-sulfur dioxide reactions was carried out using the recipe of Example I except that varying amounts of the emulsifying agent, di-secondary-butyl naphthalene sodium sulfonate, were used. The temperature was maintained at 30° C. while the reactants were agitated for a 21-hour period. The following results were obtained:

| Emulsifier, Parts | Conversion, Percent |
|---|---|
| 2.5 | 89 |
| 5.0 | 87 |
| 7.5 | 85 |
| 10.0 | 81 |

No precoagulation occurred in any case. The latex was stripped by heating to 65° C., coagulated by the brine-methanol method, filtered, washed, and dried. A fine white powder was obtained.

EXAMPLE III

Olefin-sulfur dioxide reactions were effected according to the recipe and procedure of Example I, using di-secondary-butyl naphthalene sodium sulfonate as the emulsifying agent, except that varying amounts of water were added. Both the latex and the resin were similar to the products obtained in Example I. The results are tabulated below:

| Water, Parts | Conversion, Percent |
|---|---|
| 100 | 88 |
| 140 | 87 |
| 180 | 83 |
| 300 | 76 |

EXAMPLE IV

To obtain some information as to the effect of varying the sulfur dioxide-olefin charge ratio on yields and quality of the polymers, runs were made in which monomer ratios were varied. The polymerizations were conducted employing a standard charge of 180 parts water, 5.0 parts emulsifier, 0.30 part lithium nitrate and varying quantities of the monomers. The reactions were run for 23 hours at 30° C., the latices coagulated and dried, and yields, inherent viscosities and heat stabilities were determined. Data are shown in the following table.

*Effect of varying monomer ratio*

| Monomer Charge, Parts | | Molar Ratio | Conv., per cent [1] | Inherent Viscosity | Heat Loss, percent/hr. at 140° C. | Appearance of Latex |
|---|---|---|---|---|---|---|
| 1-$C_4H_8$ | $SO_2$ | | | | | |
| 46.5 | 159.3 | 1:3 | 81 | 0.35 | 0.38 | No emulsion. White gel in clear yellow liquid. |
| 46.5 | 106.2 | 1:2 | 97 | 0.35 | 0.36 | Stable, very foamy latex. Latex rather viscous. |
| 46.5 | 53.1 | 1:1 | 62 | 0.33 | 0.37 | Emulsified. Very thin, colorless upper layer separated on standing. |
| 93.0 | 53.1 | 2:1 | 53 | 0.30 | 0.53 | Emulsified. Colorless upper layer separated on standing. |
| 139.5 | 53.1 | 3:1 | 53 | 0.27 | 0.81 | Emulsified. Separated into two phases on standing. |

[1] Based on weight of monomer charged in smaller molar quantity.

These data indicated a slight decrease in molecular weight and a considerable lowering of heat stability with increase in the hydrocarbon to sulfur dioxide ratio. More notable were the differences in the polymer yields and properties of the latices produced with the various charges. The highest yield of polymer was obtained with a charge having twice the theoretical quantity of sulfur dioxide. This combination also gave the most stable latex; however, this observation probably can be attributed to the absence of unreacted 1-butene in this latex. It appears that the yield of polymer is limited by the availability of the sulfur dioxide, and by charging the latter in considerable excess a more nearly quantitative conversion of the olefin is effected. It was of interest that even with a large excess of 1-butene only 53 per cent of the sulfur dioxide reacted. Based on these results it appears that an excess of sulfur dioxide is required for optimum yield of polymer and to minimize the recovery of unreacted monomers, although it is doubtful if as much as twice the theoretical charge is required.

EXAMPLE V

It was of interest also to determine the rate of conversion in the early stages of reaction, particularly as a function of the temperature of reaction.

This was done in two ways. Small reactors were charged and agitated for varying periods of time, after which they were removed and the contents coagulated immediately, and the conversions determined by the weight of polymer obtained. The second, and more rapid, procedure involved the use of sealed glass tubes as reactors. These were charged and agitated, and were removed at various times to measure the height of the liquid in the tubes in order to follow the rate of decrease in volume with time. After a high conversion had been reached, the tube was opened and the contents coagulated, dried and weighed. Assuming a linear relation between volume decrease and conversion, it was then possible to calculate the conversion at each time that a volume reading was made. In this way, smooth curves were obtained of conversions with time. It was observed that conversion points obtained by weighing the total contents of the small reactors polymerized for various periods of time fall very near to the curve obtained in sealed tubes run at the same temperature, and that good duplication was obtained between a number of tubes run at the same time.

The recipe employed was as follows:

| | Parts |
|---|---|
| Sulfur dioxide | 61.8 |
| 1-butene | 46.5 |
| Emulsifier [1] | 5.0 |
| Lithium nitrate | 0.30 |
| Water | 180 |

[1] Di-secondary-butyl naphthalene sulfonate.

The data are presented in the following table:

*Rate of emulsion copolymerization of sulfur dioxide and 1-butene at various temperatures*

| Reaction Temperature, °C. | Reaction Time, Hours | Conversion, Percent of Theoretical | | | |
|---|---|---|---|---|---|
| | | Tube 1 | Tube 2 | Tube 3 | Tube 4 |
| 10 | 1 | 0 | 0 | 0 | 0 |
| | 3 | 1.1 | 1.0 | 1.0 | 0 |
| | 6 | 4.0 | 2.9 | 2.9 | 2.7 |
| | 9.5 | 11.1 | 9.8 | 11.6 | 10.1 |
| | 18.5 | 47.3 | 43.9 | 46.3 | 46.7 |
| | 23.25 | 57.3 | 54.6 | 56.9 | 58.6 |
| | 27.25 | 61.4 | 59.5 | 62.7 | 63.2 |
| | 44.5 | 69.4 | 68.3 | 70.3 | 73.3 |
| | 95.5 | 79.5 | 79.0 | 81.0 | 83.3 |
| 20 | 1 | 1.8 | 1.9 | 1.0 | 1.8 |
| | 2 | 6.3 | 5.6 | 4.6 | 5.3 |
| | 3 | 16.1 | 15.0 | 13.9 | 13.1 |
| | 6 | 53.6 | 53.3 | 51.0 | 49.8 |
| | 8 | 63.4 | 62.7 | 60.3 | 58.6 |
| | 13.5 | 71.4 | 70.2 | 68.6 | 67.4 |
| | 19 | 75.0 | 74.9 | 72.3 | 70.9 |
| | 24 | 76.7 | 76.7 | 74.2 | 73.5 |
| 30 | 1.1 | 10.8 | 11.5 | 8.5 | |
| | 3 | 57.7 | 61.8 | 61.4 | |
| | 5 | 64.6 | 69.5 | 69.9 | |
| | 8 | 68.4 | 73.3 | 73.3 | |
| | 19.5 | 73.8 | 79.4 | 79.3 | |
| 40 | 0.5 | 9.8 | 9.1 | 8.8 | |
| | 1.0 | 51.8 | 50.6 | 51.7 | |
| | 1.5 | 72.0 | 68.0 | 72.2 | |
| | 2.0 | 78.0 | 78.7 | 78.0 | |
| | 18.0 | 93.0 | 93.6 | 92.6 | |

Reference to the table leads to the following conclusions:

(1) The rate of polymerization of this recipe increases rapidly with increase in reaction temperature over the range studied.

(2) The conversion curves, when the data are plotted, have a typical S-shape with a period of induction, a period of rapid polymerization, and a leveling off period toward the end of the reaction.

(3) With increase in reaction temperature there is an increase in the conversion reached before the reaction stops.

(4) Excellent duplication was obtained among the various charges. This indicates that the reaction is not particularly sensitive to traces of extraneous materials or to rate of agitation.

As will be evident to those skilled in the art, various modifications of this invention can be made, or followed, in the light of the foregoing disclosure and discussion, without departing from the spirit or scope of the disclosure or from the scope of the claims.

What is claimed is:

1. An improved process for producing a heteropolymeric resinous material by interreaction of sulfur dioxide and a normal butene, which comprises reacting said materials while incorporated in an aqueous emulsion comprising between about 150 and 1000 parts of water by weight per 100 parts by weight of normal butene, and containing a lithium nitrate catalyst in an amount between 0.03 and 0.6 part by weight and between 1 and 10 parts by weight of di-secondary-butyl naphthalene sodium sulfonate as an emulsifying agent, and recovering a light, powdery, resinous material as a product of the process.

2. In the production of a solid heteropolymeric resin resulting from interreaction of sulfur dioxide and monoolefinic organic material containing not more than twenty carbon atoms per molecule employing a catalytic agent, and employing at least one molecular equivalent of sulfur dioxide and five molecular equivalents of said organic material, the improvement which comprises conducting said reaction with said reactants being dispersed in an aqueous emulsion and recovering said resin from the emulsion.

3. In the improvement of claim 2, conducting said reaction in an emulsion comprising between about 150 and about 1000 parts by weight of aqueous medium per 100 parts by weight of said monoolefinic organic material and in the presence of a molar excess of sulfur dioxide over said unsaturated organic material.

4. A process for preparing a latex comprising a finely divided resinous material present as a suspension in an aqueous medium, which comprises emulsifying a monoolefinic organic compound containing not more than twenty carbon atoms per molecule in an aqueous medium, in an emulsion of the oil-in-water type, and in the presence of sulfur dioxide in an amount stoichiometrically in excess of said monoolefinic organic compound, effecting a reaction between sulfur dioxide and said monoolefinic organic compound employing a catalytic agent to produce a heteropolymeric reaction product, and recovering a resulting latex.

5. The process of claim 4 wherein said latex is recovered when between 50 and 90 per cent of said monoolefinic organic compound has undergone reaction.

6. The process of claim 5 wherein said reaction is conducted in the presence of a catalyst having oxidizing properties for said reaction.

7. The process of claim 4 wherein said monoolefinic organic compound is 1-butene.

8. An improved process for reacting a monoolefinic organic compound having not more than twenty carbon atoms per molecule with sulfur dioxide to produce a heteropolymeric resinous product, which comprises admixing said reactants in a molar ratio between 1:1 and 1:5 in the presence of water in an amount between 150 and 1000 parts by weight per 100 parts of said olefinic organic compound and sufficient to produce a final liquid latex, including in said admixture an emulsifying agent which is effective in an acid medium and a polymerization catalyst, maintaining said admixture emulsified at a reaction temperature for a time sufficient to react at least 50 per cent of said olefinic compound, and recovering a resulting heteropolymeric product so produced.

9. The process of claim 8 in which said emulsifying agent is di-secondary-butyl naphthalene sulfonate and said catalyst is a nitrate.

10. The process of claim 8 in which said emulsifying agent is lauryl sodium sulfate and said catalyst is a nitrate.

11. The process of claim 8 in which said emulsifying agent is diamyl sodium sulfo-succinate and said catalyst is a nitrate.

12. In a process of making an olefin-sulfur dioxide heteropolymeric resin, the process which comprises admixing an olefin hydrocarbon having not more than twenty carbon atoms per molecule with a molecular excess of sulfur dioxide in the presence of water in an amount not greater than 1000 parts by weight per 100 parts of said olefin and sufficient to produce a final liquid emulsion, also admixing therewith a catalyst which is capable of inducing the reaction of sulfur dioxide with an olefinic compound at an appreciable rate in the absence of light in an amount between 0.03 and 0.6 part per 100 parts reactants, and maintaining said mixture emulsified at a reaction temperature between —10 and 60° C. for a time sufficient to react at least 50 per cent of said olefin.

13. The process of claim 12 wherein said olefin comprises a normal butene.

14. A process for producing a heteropolymeric resinous material by interreaction of sulfur dioxide and an unsaturated organic material which reacts with sulfur dioxide to form such a resin, employing at least one molecular equivalent of sulfur dioxide and five molecular equivalents of said organic material, which comprises reacting sulfur dioxide with an unsaturated organic material which reacts with sulfur dioxide to form a heteropolymeric resin and selected from at least one of the group consisting of monoolefinic organic compounds containing not more than twenty carbon atoms per molecule and conjugated diolefin hydrocarbons containing four to six carbon atoms per molecule while incorporated in an aqueous emulsion containing a catalyst suitable for effecting said reaction and containing also an emulsifying agent effective in an acidic aqueous medium.

15. The process of claim 14 in which said emulsion comprises between 150 and 1000 parts by weight of aqueous medium per 100 parts by weight of said unsaturated organic material.

16. The process of claim 15 in which said emulsion contains a molar excess of sulfur dioxide over said unsaturated organic material.

17. The process of claim 14 in which said emulsion contains a molar excess of sulfur dioxide over said unsaturated organic material.

18. A stable synthetic latex comprising a dispersion in water of a heteropolymeric resin of approximately one molecular equivalent of sulfur dioxide and one molecular equivalent of a monoolefinic organic compound having not more than twenty carbon atoms per molecule.

19. A stable synthetic latex comprising a continuous aqueous phase, an emulsifying agent, and as a dispersed phase a finely divided heteropolymeric resin of approximately one molecular equivalent of sulfur dioxide and one molecular equivalent of a monoolefinic organic compound having not more than twenty carbon atoms per molecule.

20. A stable synthetic latex comprising a dispersion in water of a heteropolymeric resin of approximately one molecular equivalent of sulfur dioxide and one molecular equivalent of an unsaturated organic material which reacts with sulfur dioxide to form such a resin and selected from at least one of the group consisting of monoolefinic organic compounds containing not more than twenty carbon atoms per molecule and conjugated diolefin hydrocarbons containing four to six carbon atoms per molecule.

21. A stable aqueous emulsion comprising a finely-divided heteropolymeric resin of 1-butene and sulfur dioxide dispersed in water.

22. In the production of a solid heteropolymeric resin resulting from interreaction of sulfur dioxide and an aliphatic monoolefinic hydrocarbon containing not more than 20 carbon atoms per molecule employing a catalytic agent, and employing at least one molecular equivalent of sulfur dioxide and five molecular equivalents of said organic material, the improvement which comprises conducting said reaction with said reactants being dispersed in an aqueous medium and recovering said resin from the aqueous medium.

23. In the production of a solid heteropolymeric resin resulting from interreaction of sulfur dioxide and propylene employing a catalytic agent, employing at least one molecular equivalent of sulfur dioxide and five molecular equivalents of said organic material, the improvement which comprises conducting said reaction with said reactants being dispersed in an aqueous medium.

24. In the production of a solid heteropolymeric resin resulting from interreaction of sulfur dioxide and 1-butene employing a catalytic agent, employing at least one molecular equivalent of sulfur dioxide and five molecular equivalents of said organic material, the improvement which comprises conducting said reaction with said reactants being dispersed in an aqueous medium.

25. In the production of a solid heteropolymeric resin resulting from the interreaction of sulfur dioxide and a pentene employing a catalytic agent, employing at least one molecular equivalent of sulfur dioxide and five molecular equivalents of said organic material, the improvement which comprises conducting said reaction with said reactants being dispersed in an aqueous medium.

26. A stable synthetic latex comprising a dispersion in water of a heteropolymeric resin of approximately one molecular equivalent of sulfur dioxide and one molecular equivalent of an aliphatic monoolefinic hydrocarbon having not more than 20 carbon atoms per molecule.

27. A stable synthetic latex comprising a finely-divided heretopolymeric resin of approximately one molecular equivalent of propylene and one molecular equivalent of sulfur dioxide dispersed in water.

28. A stable synthetic latex comprising a finely-divided heteropolymeric resin of approximately one molecular equivalent of a pentene and one molecular equivalent of sulfur dioxide dispersed in water.

WILLIE W. CROUCH.
RICHARD K. HARRIS,
Administrator of the estate of Ernest W. Cotten, deceased.

References Cited in the file of this patent

UNITED STATES PATENTS

| Number | Name | Date |
| --- | --- | --- |
| 2,097,263 | Strain | Oct. 26, 1937 |
| 2,105,511 | Snow et al. | Jan. 18, 1938 |
| 2,112,986 | Frey et al. | Apr. 5, 1938 |
| 2,342,400 | Hopff et al. | Feb. 22, 1944 |
| 2,371,719 | Starkweather | Mar. 20, 1945 |
| 2,383,055 | Fryling | Aug. 21, 1945 |
| 2,425,638 | Peterson | Aug. 12, 1947 |
| 2,453,039 | Scribner et al. | Nov. 2, 1948 |
| 2,572,185 | Noether et al. | Oct. 23, 1951 |

OTHER REFERENCES

K. H. Meyer, Natural and Synthetic High Polymers (Interscience) 1942, pp. 95 and 96. Copy in Div. 50.